Jan. 19, 1960  P. N. WHEELER  2,921,760
ADJUSTABLE RESILIENT FOOT FOR MACHINERY
Filed Dec. 6, 1957

INVENTOR
Parker N. Wheeler
BY Robert S. Toperzer
ATTORNEY

2,921,760

ADJUSTABLE RESILIENT FOOT FOR MACHINERY

Parker N. Wheeler, Massapequa, N.Y., assignor to The Felters Company, Boston, Mass., a corporation of Massachusetts Application December 6, 1957, Serial No. 701,012

1 Claim. (Cl. 248—24)

This invention relates to mountings for machinery and more particularly it relates to machinery mountings which are adapted to absorb shock and vibration.

It is a well known fact that many types of heavy machinery used in industry, tend to produce highly undesirable noise and vibrations, and especially is this true where normal operation of the machine involves intense shock, or vibratory movements of substantial amplitude. Unless adequate precautions are taken such shock or vibration may even cause the machine to shift position which often results in excessive wear. Another important factor that ordinarily must be taken into account when installing machinery is lack of levelness of the mounting area. Although most machines have to be mounted in a substantially level position in order to operate properly, it is often difficult or impossible to find a sufficiently level floor area in the vicinity of the desired location for the machine. Levelling of the machine by means of permanent base supports or by means of wedges driven under the machine is a common expedient but it may be costly and time consuming, especially where the possibility exists that the machine may be moved to a new location.

It is an object of the present invention to provide a shock and vibration absorbing mounting which can be quickly and easily fastened to the base foot of a machine and which is adapted to be raised or lowered to permit precision levelling of the machine.

Another object of the invention is to provide a machinery mounting which may be vertically adjusted without the necessity for relieving the weight of the machine therefrom.

Another object of the invention is to provide a mounting of the above-mentioned character which can adapt to various out of true conditions.

The novel features of the invention together with further objects and advantages thereof will become apparent from the following description of a preferred embodiment and from the accompanying drawing to which the description refers.

Figure 1:
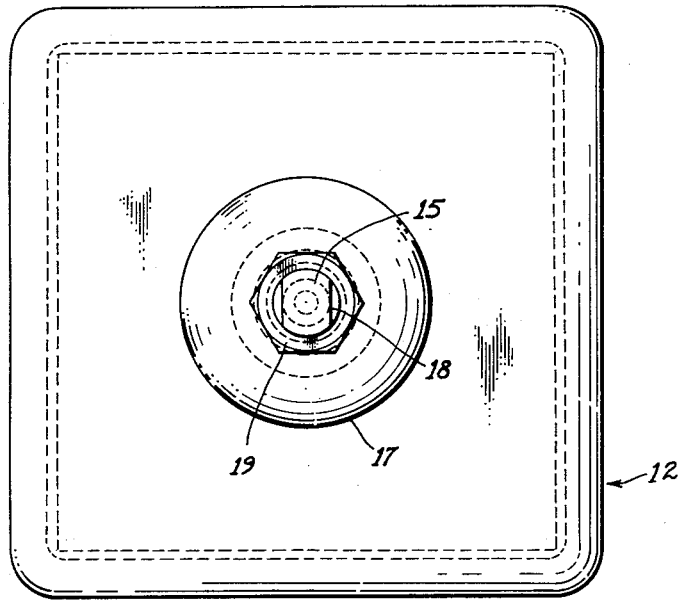
Fig. 1 is a plan view of a mounting device according to the invention.
Figure 2:
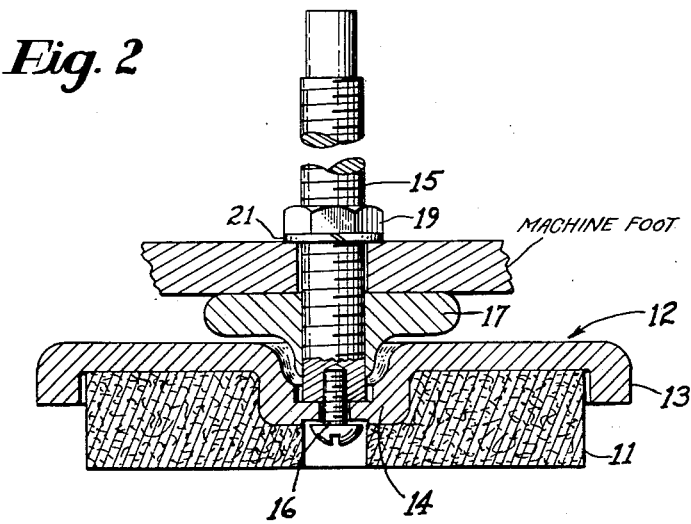
Fig. 2 is a cross-sectional view of the device.

With reference now to the drawing, it will be observed that the device includes a pad 11 of heavy duty, resilient material such as felt, which is capable of supporting great weight and will not be deteriorated or hardened by water, mild acids or alkalis. Affixed to the upper surface of the pad 11 by an appropriate cement is a base plate 12 with a down-turned flange 13 around its edge. The plate is preferably formed of steel, and has a circular cup-shaped depression 14 in its central region which fits into a corresponding recess in the center of the pad.

Resting in the base of the depression is a heavy duty threaded stud bolt 15 which is normally maintained in a generally upright position by a button-head cap screw 16. Cap screw 16 extends upwardly through a clearance hole in the base wall of the depressed portion of the plate, and is threaded into the bolt 15. The screw fits loosely in the plate so that the bolt will be free to rotate about its axis and also so that it can tilt to a limited extent as is frequently necessary.

Above the base plate 12, there is a levelling plate 17 in threaded engagement with the bolt. Levelling plate 17 has an axially depending portion generally contoured to match the cup-shaped depression 14 in the base plate but of slightly smaller dimension. This gives added strength to the levelling plate without increasing its lower limit of travel. Finally, the bolt 15 is provided with flats 18 at its upper end so that it can be readily engaged for turning by a wrench or other suitable tool and there is a locknut 19 adapted to be threaded over the upper end of the bolt. Preferably, a lock washer 21 is utilized in combination with the nut.

In operation, first the locknut and washer are removed from the bolt, and then the machine foot is let down over the bolt until it rests upon the levelling plate. Generally the machine foot will be provided with a suitable clearance hole for the bolt but if there is none, it will be necessary, of course, to provide a suitable clearance hole. The machine may then be levelled by turning the bolt. That is to say, the levelling plate, being heavily weighted and in firm contact with the foot, will not rotate but will move up or down on the bolt depending upon the direction in which the bolt is turned. As a result, the foot will be raised or lowered correspondingly.

When the machine has been levelled, the washer is placed over the bolt so that it overlies the foot, and the locknut is tightened against it to hold the foot firmly in place on the levelling plate during operation of the machine. Subsequent levelling adjustments may be made merely by loosening the locknut and readjusting the height of the levelling plate as desired.

Owing to the provision of a member which rides up and down on a bolt having a suitable turning head at its upper end, the device according to the present invention offers the very important advantage that height adjustments of the machine foot are permitted while the weight of the machine is resting on the mount. Furthermore, the fact that the turning head is located at the top of the stud allows the levelling plate to operate nearer to the base, thus increasing its lateral stability.

The supporting felt pad is firm enough so that during compression under full static load, an appreciable spacing is maintained between the head of the cap screw and the floor. As a result, the felt pad will be effective to isolate relatively large vibrational and impact forces. In addition to the ability of the pad to isolate or damp out shock and vibration, it also has an effective gripping action on the floor which tends to prevent any lateral movement of the machine. This eliminates the need for anchor bolts and screws in most applications, thereby facilitating removal of the machine to a new location. In fact, it will be possible usually to leave the mountings on the machine while it is being moved.

Of substantial practical importance, is the mode of connection that has been provided to the lower end of the bolt, namely the screw which projects through the relatively large clearance hole in the base plate. With this arrangement, the bolt is left free to undergo a limited amount of tilting movement with respect to the base plate without which effective use of the mount could not be made on inclined floor surfaces. By the same token, the bolt can be tilted with respect to the machine foot to accommodate clearance holes therein that are out of true, and where the clearance is ample, to accommodate an imperfect machine foot bearing surface. In sum, the mount is designed to meet virtually all conditions that will be encountered in practice.

Various modifications of the illustrative embodiment described in the foregoing that are within the spirit and scope of the invention will no doubt occur to those skilled in the art and therefore the invention should not be deemed to be limited to the specific details of what has been described by way of illustration but rather it should be deemed to be limited only by the scope of the appended claim.

What is claimed is:

A mounting device for machinery comprising a felt pad having a cup-shaped recess in the central portion thereof, a base plate overlying the entire upper surface of said pad and having a downturned flange around its edge overlying only the upper edge portion of said pad, said base plate having a substantially centrally positioned cup-shaped depending portion positioned in said recess in said pad, the inner surface of said cup-shaped depending portion of said base plate having a cylindrical periphery adjacent the bottom thereof and an outwardly curved upper portion merging into the upper surface of said base plate, a threaded stud bolt supported by said base plate and having its bottom portion positioned in and spaced from said cylindrical periphery of said inner surface of said cup-shaped depending portion; said base plate having an aperture through the bottom of said depending portion, a screw recessed in said pad and extending upwardly through and spaced from said aperture and threaded into the bottom portion of said stud bolt, the space between said screw and said aperture being sufficient to permit a limited amount of tilting movement of said bolt relative to said base plate, and a levelling plate threaded onto said bolt adapted to underlie and be in contact with the machinery foot, the under surface of said levelling plate having an axially depending portion, spaced from and generally contoured to match said curved upper portion of the inner surface of said cup-shaped portion of said base plate, said bolt having a turning head at its upper extremity adapted to be positioned above the machinery foot and be rotatively engaged while said levelling plate is held against rotation under load of the machinery thereby to effect an adjustment of the vertical level of said levelling plate.

References Cited in the file of this patent

UNITED STATES PATENTS

| | | |
|---|---|---|
| 1,814,334 | Potigan | July 14, 1931 |
| 1,886,112 | Luarde | Nov. 1, 1932 |
| 2,010,299 | Gray | Aug. 6, 1935 |
| 2,387,066 | Harding | Oct. 16, 1945 |
| 2,739,774 | Crede | Mar. 27, 1956 |